(12) United States Patent
Fang

(10) Patent No.: US 11,995,283 B2
(45) Date of Patent: May 28, 2024

(54) TOUCH CONTROL PANEL AND DISPLAY DEVICE WITH COMPENSATION AREA ELECTRODES

(71) Applicants: WUHAN CHINA STAR OPTOELECTRONICS TECHNOLOGY CO., LTD., Wuhan (CN); WUHAN CHINA STAR OPTOELECTRONICS SEMICONDUCTOR DISPLAY TECHNOLOGY CO., LTD., Wuhan (CN)

(72) Inventor: Liang Fang, Wuhan (CN)

(*) Notice: Subject to any disclaimer, the term of this patent is extended or adjusted under 35 U.S.C. 154(b) by 0 days.

(21) Appl. No.: 17/422,458

(22) PCT Filed: Jun. 10, 2021

(86) PCT No.: PCT/CN2021/099312
§ 371 (c)(1),
(2) Date: Jul. 13, 2021

(87) PCT Pub. No.: WO2022/246921
PCT Pub. Date: Dec. 1, 2022

(65) Prior Publication Data
US 2024/0019973 A1    Jan. 18, 2024

(30) Foreign Application Priority Data
May 24, 2021 (CN) .......................... 202110564119.1

(51) Int. Cl.
*G06F 3/044* (2006.01)
*G06F 3/041* (2006.01)

(52) U.S. Cl.
CPC ........ *G06F 3/0448* (2019.05); *G06F 3/04164* (2019.05); *G06F 3/0418* (2013.01);
(Continued)

(58) Field of Classification Search
CPC .... G06F 3/0448; G06F 3/0418; G06F 3/0443; G06F 3/0412; G06F 3/04164; G06F 2203/04112
See application file for complete search history.

(56) References Cited

U.S. PATENT DOCUMENTS

2018/0067599 A1* 3/2018 Cai ................... G06F 3/0412
2019/0004626 A1* 1/2019 Ko .................... G06F 3/0443
(Continued)

FOREIGN PATENT DOCUMENTS

CN    106855763 A    6/2017
CN    107153492 A    9/2017
(Continued)

*Primary Examiner* — Darlene M Ritchie

(57) ABSTRACT

The present application discloses a touch control panel and a display device. The touch control panel includes a touch control electrode array including a plurality of first touch control electrodes and at least one second touch control electrode, an area of the second touch control electrode is smaller than an area of each of the first touch control electrodes; a compensation electrode disposed on the second touch control electrode and electrically connected to the second touch control electrode, wherein the compensation electrode is configured to compensate and expand the area of the second touch control electrode; and a touch control connection pad, wherein the touch control electrode array is electrically connected to the touch control connection pad through a touch control signal line.

15 Claims, 4 Drawing Sheets

(52) U.S. Cl.
CPC .......... *G06F 3/0443* (2019.05); *G06F 3/0412* (2013.01); *G06F 2203/04112* (2013.01)

(56) References Cited

U.S. PATENT DOCUMENTS

| | | | |
|---|---|---|---|
| 2020/0064955 A1* | 2/2020 | Wang | G06F 3/047 |
| 2020/0167040 A1* | 5/2020 | Shepelev | G06F 3/047 |
| 2021/0004126 A1* | 1/2021 | Jang | G06F 3/0443 |
| 2022/0091718 A1* | 3/2022 | Park | G06F 3/04164 |
| 2022/0253177 A1* | 8/2022 | Fan | G06F 3/0445 |
| 2023/0176702 A1* | 6/2023 | Yan | G06F 3/0446 |
| | | | 345/173 |

FOREIGN PATENT DOCUMENTS

| | | | | |
|---|---|---|---|---|
| CN | 107315500 A | | 11/2017 | |
| CN | 109375802 A | | 2/2019 | |
| CN | 110308823 A | | 10/2019 | |
| CN | 110837314 A | | 2/2020 | |
| CN | 111078052 A | * | 4/2020 | .......... G06F 3/0418 |
| CN | 111538443 A | | 8/2020 | |
| CN | 112328117 A | | 2/2021 | |
| GB | 2611204 A | * | 3/2023 | .......... G06F 3/0412 |
| JP | 2013254360 A | | 12/2013 | |
| KR | 20020037518 A | | 5/2002 | |
| KR | 20210034203 A | * | 9/2019 | .......... G06F 3/0418 |
| WO | WO-2022047763 A1 | * | 3/2022 | .......... G06F 3/0412 |

\* cited by examiner

A-A

TOUCH CONTROL PANEL AND DISPLAY DEVICE WITH COMPENSATION AREA ELECTRODES

BACKGROUND OF INVENTION

Field of Invention

The present application relates to the technical field of display panels, and in particular to a touch control panel and a display device.

Description of Prior Art

Display devices mainly include liquid crystal displays (LCDs), plasma display panels (PDPs), organic light emitting diode (OLED), and active matrix organic light emitting diode (AMOLED), which have a wide range of applications in vehicles, mobile phones, tablets, computers, and TV products.

In general, touch control functions have become one of standard configurations of most display devices, among which capacitive touch control screens are widely used. Basic principle is to use tools such as a finger or stylus to generate capacitance with the touch control screen, and use an electrical signal formed by a change of the capacitance before and after a touch control to confirm whether a panel is touched or not and confirm touch control coordinates.

One of important touch control technology of capacitive touch control panels is self-capacitive mode, which can realize the touch control function through one or two layers of metal. FIG. 1 shows a schematic diagram of a conventional design, where touch control electrodes and touch control signal lines are formed of two layers of metal. Based on this design, an area of each of the touch control electrodes near areas of four corners of the display device are relatively small compared to that in a normal area, and its corresponding capacitance value C is relatively small, which ultimately leads to a decrease in touch control performance in corner areas of the display device.

SUMMARY OF INVENTION

An embodiment of the present application provides a touch control panel display device to solve the problem of reduced touch control performance in a corner area of the existing display device.

An embodiment of the present application provides a touch control panel, including: a touch control electrode array including a plurality of first touch control electrodes and at least one second touch control electrode, an area of the second touch control electrode is smaller than an area of each of the first touch control electrodes;
  a compensation electrode disposed on the second touch control electrode and electrically connected to the second touch control electrode, wherein the compensation electrode is configured to compensate and expand the area of the second touch control electrode; and
  a touch control connection pad, wherein the touch control electrode array is electrically connected to the touch control connection pad through a touch control signal line.

Further, areas of some of the first touch control electrodes are same, and are all S1, and a sum of the area of the second touch control electrode and an area of the compensation electrode is S2, wherein $0.75 S1 \leq S2 \leq 1.25 S1$.

Further, a compensation electrode line of the compensation electrode is electrically connected to a touch control electrode line of the second touch control electrode to form an electrical connection between the compensation electrode and the second touch control electrode; and
  an effective touch control area per unit area of the compensation electrode is larger than an effective touch control area per unit area of touch control electrodes in the touch control electrode array.

Further, a line width of the compensation electrode line is greater than a line width of the touch control electrode line.

Further, the compensation electrode is electrically connected to the touch control electrode line of the second touch control electrode through a compensation electrode plate to form an electrical connection between the compensation electrode and the second touch control electrode.

Further, a line width of the compensation electrode line gradually increases from an end close to the touch control electrode line to an end away from the touch control electrode line.

Further, the first touch control electrodes and the second touch control electrode are arranged at equal intervals along a first direction and a second direction perpendicular to each other to form a matrix structure of the touch control electrode array;
  the second touch control electrode is located at a corner area of the touch control electrode array;
  a number of the second touch control electrode corresponds to a number of corners of the touch control electrode array, and the corners are in one-to-one correspondence with the second touch control electrode.

Further, the touch control electrode array corresponding to an under-screen camera is provided with a second touch control electrode that has an area smaller than each of the first touch control electrodes, and the compensation electrode is disposed on the second touch control electrode.

Further, a number of touch control signal line is same as a number of touch control electrodes in the touch control electrode array, and the touch control signal line is in one-to-one correspondence with the touch control electrodes; and
  wherein an end of the touch control signal line is electrically connected to the touch control electrodes, and another end of the touch control signal line is electrically connected to the touch control connection pad.

Another embodiment of the present application also provides a display device including a display panel and the touch control panel.

Further, the display panel includes a non-bending area, a bending area, and a bonding area, the non-bending area is connected to the bonding area through the bending area, and the non-bending area includes a display area and a non-display area located at a periphery of the display area;
  wherein the touch control electrode array is arranged in the display area, and the compensation electrode disposed on the second touch control electrode at a corner of the touch control electrode array is located in the non-display area; and
  wherein the touch control connection pad is arranged in the bonding area, and a display connection pad is further arranged in the bonding area, and the display area is connected to the display connection pad through a display connection line.

Beneficial effects of the present application are that the compensation electrode is connected to the second touch control electrode with a relatively small area, thereby increasing a capacitance value of the second touch control electrode, so that a relevant nearby area corresponding to the second touch control electrode can also meet touch control performance specifications, thereby enhancing market competitiveness of products.

BRIEF DESCRIPTION OF DRAWINGS

The technical solutions and beneficial effects of the present application will be made obvious by describing the specific embodiments of the present application in detail below in conjunction with the accompanying drawings.

In FIG. 2 and FIG. 7, X represents a first direction, and Y represents a second direction.

DETAILED DESCRIPTION OF PREFERRED EMBODIMENTS

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by those skilled in the art without creative work shall fall within the protection scope of the present disclosure.

In the touch control panel, an area of a second touch control electrode is increased by adding a compensation electrode on the second touch control electrode having a relatively small area, and a capacitance value C of the second touch control electrode is thereby increased, so that a nearby area of the touch control panel corresponding to the second touch control electrode meets touch control performance specifications (for example, achieves touch control performance of the relevant area near the first touch control electrode). As a typical application, the touch control panel can be applied to a display device with a touch control function, especially a display device with a capacitive touch control panel.

Figure 1:
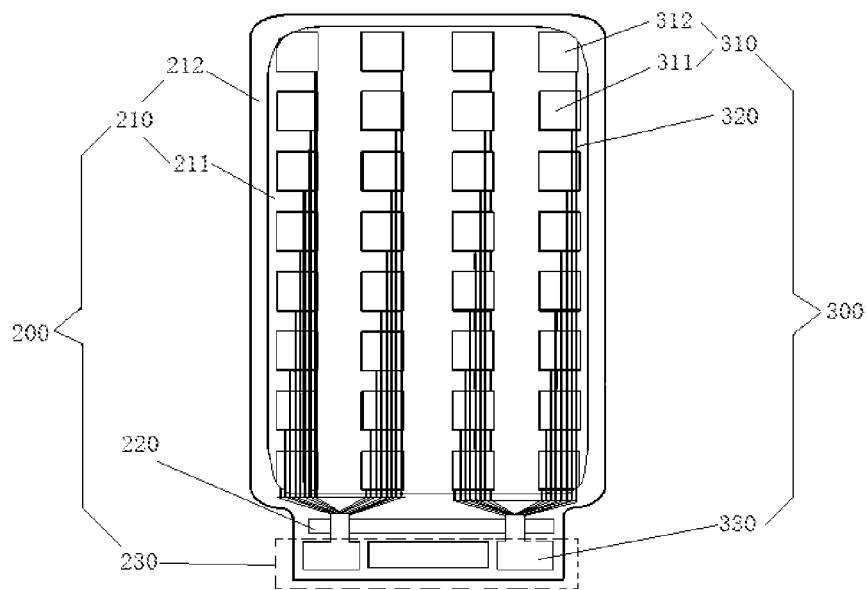
FIG. 1 is a schematic structural diagram of an existing display device.
Figure 2:
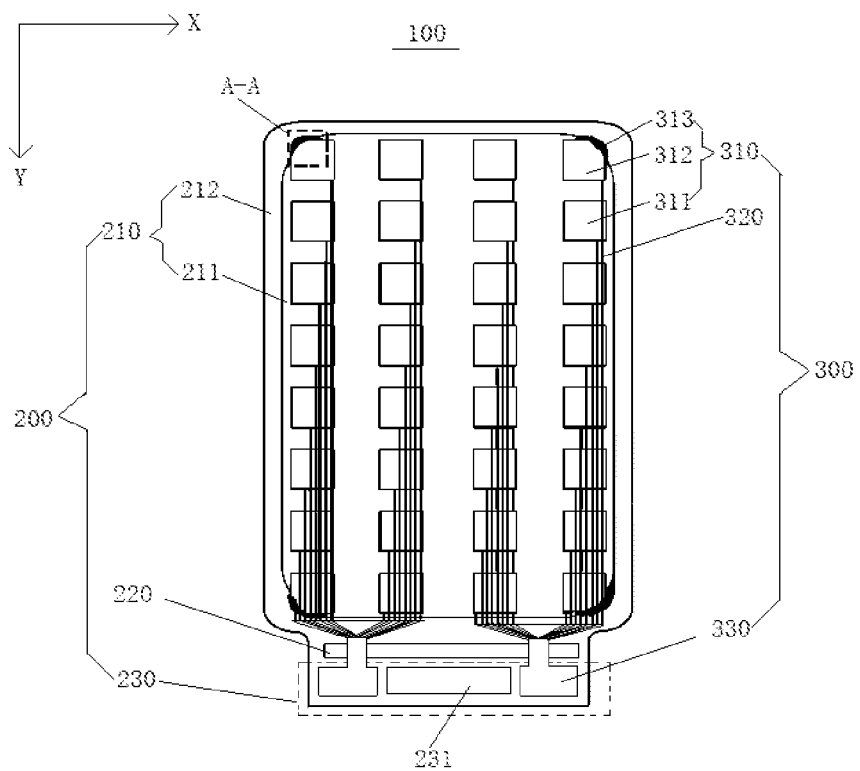
FIG. 2 is a schematic structural diagram of a display device provided by an exemplary embodiment of the present invention.
Figure 3:
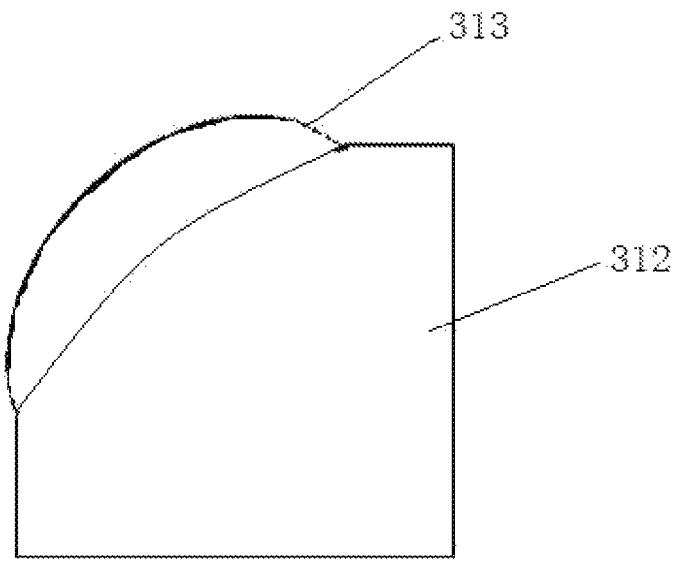
FIG. 3 is an enlarged view along line A-A of FIG. 2.
Figure 4:
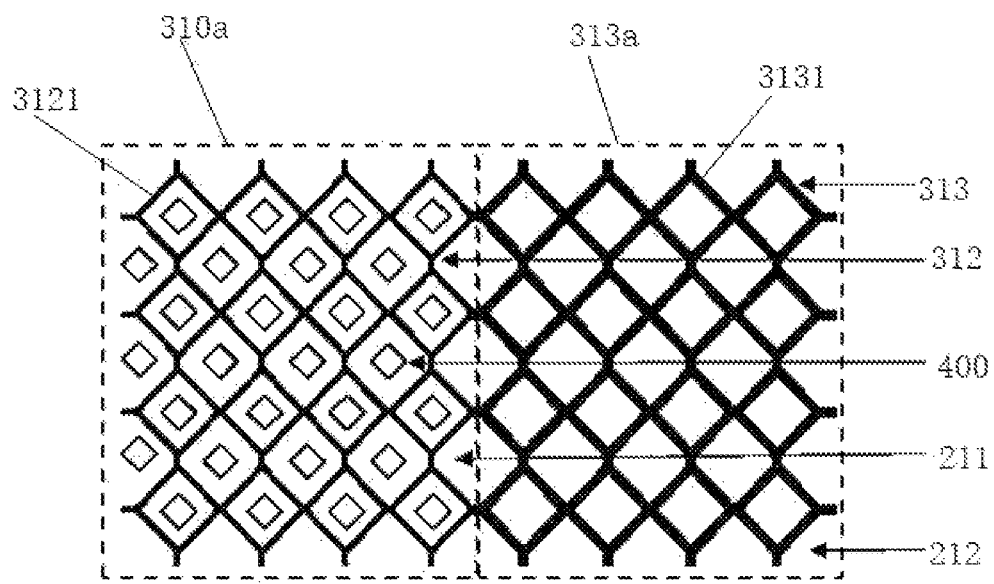
FIG. 4 is a schematic diagram showing a connection between a touch control electrode area of a second touch control electrode and a compensation electrode area of a compensation electrode in an exemplary embodiment of the present invention.

Referring to FIGS. 2 to 4, in an embodiment of the present invention, the touch control panel 300 includes a touch control electrode array 310, a touch control signal line 320, and a touch control connection pad 330. The touch control electrode array 310 includes a plurality of first touch control electrodes 311 and at least one second touch control electrode 312, an area of the second touch control electrode 312 is smaller than an area of each of the first touch control electrodes 311; a compensation electrode 313 disposed on the second touch control electrode 312 and electrically connected to the second touch control electrode 312, wherein the compensation electrode 313 is configured to compensate and expand the area of the second touch control electrode 312, and the first touch control electrodes 311 and the second touch control electrode 312 in the touch control electrode array 310 are electrically connected to a touch control connection pad 330 through touch control signal lines 320, respectively.

The touch control signal lines 320 and the touch control electrode array 310 have the same number of touch control electrodes. One touch control signal line 320 corresponds to one touch control electrode. One end of the touch control signal line 320 is electrically connected to the touch control electrode, and another end of the touch control signal line 320 is electrically connected to the touch control connection pad 330. The touch control signal lines 320 and the touch control electrodes may adopt a design of single-layered metal or double-layered metal, and FIG. 2 shows a design of double-layered metal.

Since a capacitance value C of the touch control electrode (including the first touch control electrode 311 and the second touch control electrode 312) is related to an area of the touch control electrode, and the area of the second touch control electrode 312 is smaller than the area of the first touch control electrode 311, touch control performance will decrease in an area corresponding to the second touch control electrode 312 due to a smaller capacitance value C. A compensation electrode 313 is added to the second touch control electrode 312, and the compensation electrode 313 is directly electrically connected to the second touch control electrode 312, so that the area of the second touch control electrode 312 can be increased, thereby increasing the capacitance value C, and thus the touch control performance of the area corresponding to the second touch control electrode 312 having an increased area meets the touch control performance specifications (for example, it reaches the same level as the touch control performance of the area corresponding to the first touch control electrode 311), effectively reducing or even eliminating touch control blind areas, and enhancing product competitiveness.

Still referring to FIGS. 2 to 4, in this embodiment, the touch control panel 300 is specifically applied to the display device 100. The display device 100 includes a display panel 200 and a touch control panel 300. The display panel 200 includes a non-bending area 210, a bending area 220, and a bonding area 230. The non-bending area 210 is connected to the bonding area 230 through the bending area 220. The non-bending area 210 includes a display area 211 and a non-display area 212 located at a periphery of the display area 211, and the touch control electrode array 310 in the touch control panel 300 is disposed in the display area 211. A touch control connection pad 330 is disposed in the bonding area 230, a display connection pad 231 is also disposed in the bonding area 230, and the display area 211 is connected to the display connection pad 231 through a display connection line 213. The touch control connection pad is abbreviated as TCP, and the display connection pad is abbreviated as DCP.

There will be missing parts in the display area 211 based on structural design needs. For example, an edge or an inner side of the display area 211 that was originally a complete rectangle (or other complete shapes) may be formed with structures such as rounded corners, gaps, notches, and openings (such as camera openings, earpiece openings) that reduce the area of the display area 211 due to design needs. For example, in FIG. 2, the four corners of the display area 211 are designed to be rounded, resulting in a reduction in the area of the display area 211, and the area of the touch electrodes disposed at the reduced area (for example, the rounded corners in this embodiment) is reduced accordingly. The touch control electrode with the reduced area is the second touch control electrode 312 (the corner of the second touch control electrode 312 is provided with a notch corresponding to the rounded corner), and in order to compensate the second touch control electrode 312 with a smaller capacitance value C due to the decrease in area, the compensation electrode 313 is added to the second touch control electrode 312. In this embodiment, the compensation electrode 313 is disposed at the notch of the second touch control electrode 312, and the compensation electrode 313 is located in the non-display area 212, so that the area of the reduced area of the display area 211 (for example, the rounded portion in this embodiment) is increased.

Figure 7:
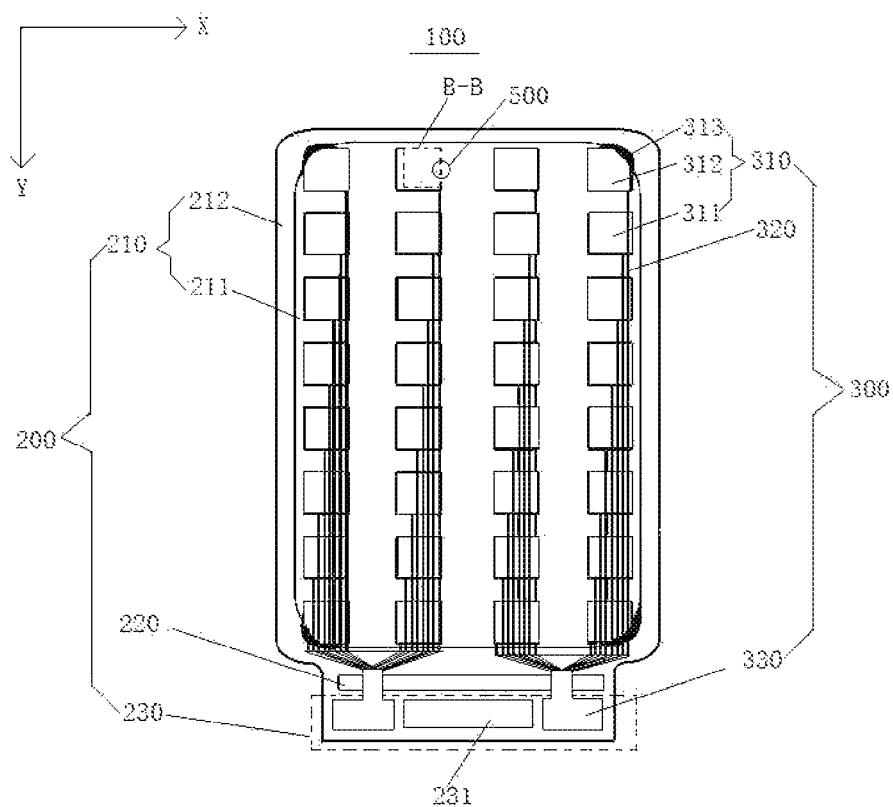
FIG. 7 is a structural diagram of a display device provided in still another exemplary embodiment of the present invention.

Referring to FIGS. 2 and 7, in an embodiment of the present invention, the first touch control electrodes 311 and the second touch control electrodes 312 are arranged at equal intervals along a first direction X and a second direction Y that are perpendicular to each other, to form a matrix structure of the touch control electrode array 310; the second touch control electrodes 312 are located in the corner areas of the touch control electrode matrix 310; a number of the second touch control electrode 312 corresponds to a number of corners of the touch control electrode array 310, and the corners are in one-to-one correspondence with the second touch control electrode 312. The first direction X is the row direction of the array shown in FIGS. 2 and 7, the second direction Y is the column direction of the array shown in FIGS. 2 and 7, and the first direction X and the second direction Y are perpendicular to each other. That is, the rows and columns are perpendicular to each other, and there are several touch control electrodes arranged at equal intervals in each of the row and column. The number of touch control electrodes in each of the row and column is a positive integer, and the specific number can be determined according to actual production needs and customer needs. Specifically, in this embodiment, the number of touch control electrodes in each row is 4, and the number of touch control electrodes in each column is 8.

In an embodiment of the present invention, the areas of the first touch control electrodes 311 are the same, and are all S1, and the sum of the area of the second touch control electrode 312 and the area of the compensation electrode 313 is S2, wherein $0.75S1 \leq S2 \leq 1.25S1$. A size of the area S2 can be determined according to actual production needs and usage needs.

In an embodiment of the present invention, the effective touch control area per unit area of the compensation electrode 313 is larger than the effective touch control area per unit area of the touch control electrode in the touch control electrode array 310. The touch control electrode may be the first touch control electrode 311 or the second touch control electrode 312. The first touch control electrode 311 and the second touch control electrode 312 have the same touch control effective area per unit area. By increasing the effective touch control area per unit area of the compensation electrode 313, the compensation electrode 313 with a smaller area can be used to combine with the second touch control electrode 312 to make the touch control performance of the area corresponding to the second touch control electrode 312 meet the touch control performance specifications, thus improving space utilization.

The compensation electrode line 3131 of the compensation electrode 313 is electrically connected to the touch control electrode line 3121 of the second touch control electrode 312 to form an electrical connection between the compensation electrode 313 and the second touch control electrode 312; the line width of the compensation electrode line 3131 is greater than the line width of the touch control electrode line 3121. In this embodiment, referring to FIG. 4, the effective touch control area per unit area of the compensation electrode 313 can be increased by changing the line width of the compensation electrode line 3131 in the compensation electrode 313, so that after the compensation electrode 313 is added, the touch control performance of the relevant nearby area corresponding to the second touch control electrode 312 meets the touch control performance specifications. In this embodiment, the line widths of the compensation electrode lines 3131 are the same. Still referring to FIG. 4, the touch control electrode lines 3121 have a grid-like shape, the pixel units 400 are arranged in unit cells of the grid-like structure, the compensation electrode 313 is located in the non-display area 212, and the shape of the compensation electrode lines 3131 and the shape of the touch control electrode lines 3121 are the same, and both are grid-like shapes, but since the compensation electrode 313 is located in the non-display area 212, the pixel unit 400 is not arranged in the grid formed by the compensation electrode lines 3131.

Figure 5:
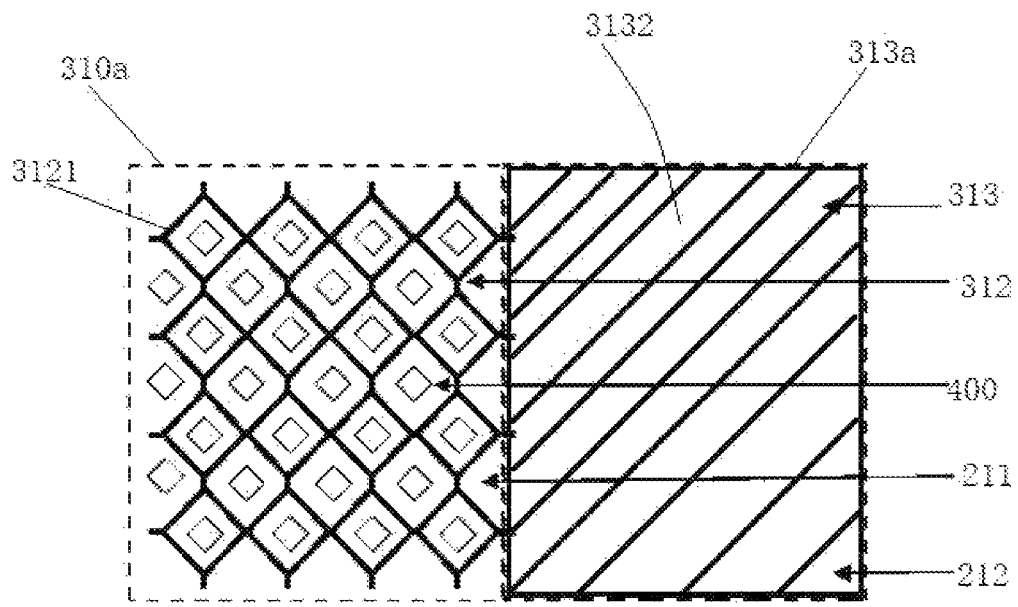
FIG. 5 is a schematic diagram showing a connection between the touch control electrode area of the second touch control electrode and the compensation electrode area of the compensation electrode in another exemplary embodiment of the present invention.

In another embodiment of the present invention, referring to FIG. 5, the compensation electrode 313 is electrically connected to the touch control electrode line 3121 of the second touch control electrode 312 through the compensation electrode plate 3132, forming an electrical connection between the compensation electrode 313 and the second touch control electrode 312. The compensation electrode plate 3132 is composed of a plurality of compensation electrode lines 3131. In this embodiment, an effective electrode density is increased (by increasing a number and density of the compensation electrode lines 3131 to form the compensation electrode plate 3132) to increase the effective touch control area per unit area of the compensation electrode 313. The compensation electrode 313 is located in the non-display area 212, and the pixel unit 400 is not provided in the compensation electrode plate 3132.

Figure 6:
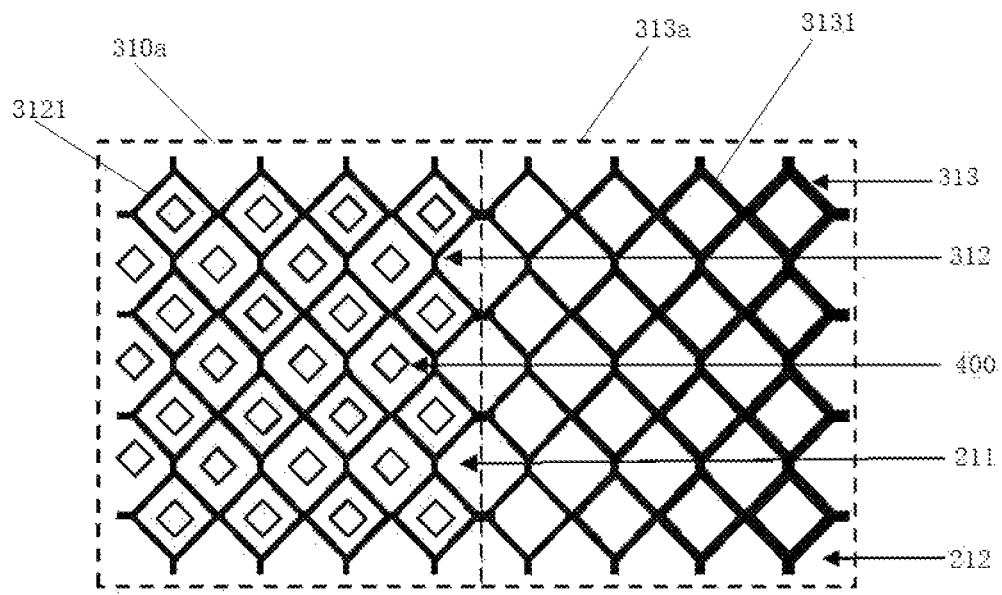
FIG. 6 is a schematic diagram showing a connection between the touch control electrode area of the second touch control electrode and the compensation electrode area of the compensation electrode in yet another exemplary embodiment of the present invention.

In another embodiment of the present invention, referring to FIG. 6, the line width of the compensation electrode line 3131 gradually increases from the end close to the touch control electrode line 3121 to an opposite end away from the touch control electrode line 3121. Since there is a risk of visibility mura at a junction of the touch control electrode area 310a (located in the display area 211) and the compensation electrode area 313a (located in the non-display area 212), in this embodiment, by gradually increasing the line width of the compensation electrode line 3131 to increase the effective touch control area per unit area of the compensation electrode 313, the touch control performance of the relevant nearby area corresponding to the second touch control electrode 312 after the compensation electrode 313 is added meets the touch control performance specifications.

Wherein, in this embodiment, the compensation electrode lines 3131 have a grid-like shape, the line width of an end of the compensation electrode line 3131 near the touch control electrode line 3121 is close to the line width of the touch control electrode line 3121, and the farther the compensation electrode line 3131 is away from the touch control electrode line, the wider the line width, and the line width of the compensation electrode line 3131 adopts a uniform transition manner and gradually increases. The compensation electrode 313 is located in the non-display area 212, the compensation electrode line 3131 is located in the non-display area 212, and the pixel unit 400 is not provided in the grid-like structure formed by the compensation electrode lines 3131.

Figure 8:
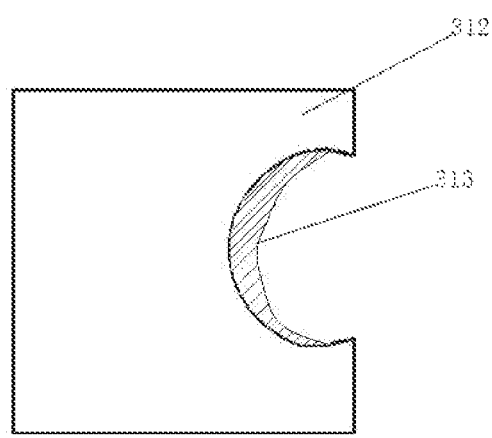
FIG. 8 is an enlarged view along line B-B of FIG. 7.

In another embodiment of the present invention, the touch control electrode array 310 corresponding to an under-screen camera 500 is provided with a second touch control electrode 312 with an area smaller than the first touch control electrode 311, and the compensation electrode 313 is provided on the second touch control electrode 312. The second touch control electrode 312 can be set not only in four corner areas of the touch control electrode array 310, but also in areas such as notches, rounded holes, etc., which are opened to meet the needs of structural design. For example, the small touch control electrode area caused by a design of the under-screen camera 500 such as an O-Cut is also within the protection scope of this invention. In this embodiment, referring to FIGS. 7 and 8, one end of the second touch control electrode 312 is provided with a notch 3122, so that the area of the second touch control electrode 312 is smaller than that of the first touch control electrode 311. The compensation electrode 313 is added in the notch 3122 to make the touch control performance of the relevant area corresponding to the second touch control electrode 312 meet the touch control requirement. In this embodiment, an increase in an effective touch control area per unit area of the compensation electrode 313 is realized by a method of increasing a line width of the compensation electrode line 3131 (for example, FIG. 4), a method of increasing a density of the compensation electrode line 3131 to form the compensation electrode plate 3132 (for example, FIG. 5), or a method of gradually increasing the line width of the compensation electrode line 3131 (for example, FIG. 6), wherein a specific method can be selected according to actual production needs and/or customer needs, so that the touch control performance of the relevant nearby area corresponding to the second touch control 312 added with the compensation electrode 313 meets the touch control performance specifications.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A touch control panel, comprising:
   a touch control electrode array comprising a plurality of first touch control electrodes and at least one second touch control electrode, an area of the second touch control electrode is smaller than an area of each of the first touch control electrodes;
   a compensation electrode disposed on the second touch control electrode and electrically connected to the second touch control electrode, wherein the compensation electrode is configured to compensate and expand the area of the second touch control electrode; and
   a touch control connection pad, wherein the touch control electrode array is electrically connected to the touch control connection pad through touch control signal lines;
   wherein a compensation electrode line of the compensation electrode is electrically connected to a touch control electrode line of the second touch control electrode to form an electrical connection between the compensation electrode and the second touch control electrode; and an effective touch control area per unit area of the compensation electrode is larger than an effective touch control area per unit area of touch control electrodes in the touch control electrode array;
   wherein the compensation electrode is electrically connected to the touch control electrode line of the second touch control electrode through a compensation electrode plate to form the electrical connection between the compensation electrode and the second touch control electrode.

2. The touch control panel according to claim 1, wherein a line width of the compensation electrode line is greater than a line width of the touch control electrode line.

3. The touch control panel according to claim 1, wherein a line width of the compensation electrode line gradually increases from an end close to the touch control electrode line to an end away from the touch control electrode line.

4. The touch control panel according to claim 1, wherein areas of some of the first touch control electrodes are the same, and are all S1, and a sum of the area of the second touch control electrode and an area of the compensation electrode is S2, wherein $0.75S1 \leq S2 \leq 1.25S1$.

5. The touch control panel according to claim 1, wherein the first touch control electrodes and the second touch control electrode are arranged at equal intervals along a first direction and a second direction perpendicular to each other to form a matrix structure of the touch control electrode array;
   the second touch control electrode is located at a corner area of the touch control electrode array;
   a number of the second touch control electrode corresponds to a number of corners of the touch control electrode array, and the corners are in one-to-one correspondence with the second touch control electrode.

6. The touch control panel according to claim 1, wherein the touch control electrode array corresponding to an under-screen camera is provided with the second touch control electrode that has the area smaller than each of the first touch control electrodes, and the compensation electrode is disposed on the second touch control electrode.

7. The touch control panel according to claim 1, wherein a number of the touch control signal lines is the same as a number of touch control electrodes in the touch control electrode array, and the touch control signal lines are in one-to-one correspondence with the touch control electrodes; and
   wherein an end of each of the touch control signal lines is electrically connected to a corresponding one of the touch control electrodes, and another end of the touch control signal line is electrically connected to the touch control connection pad.

8. A display device, comprising: a display panel and a touch control panel, wherein
   the touch control panel comprises:

a touch control electrode array comprising a plurality of first touch control electrodes and at least one second touch control electrode, an area of the second touch control electrode is smaller than an area of each of the first touch control electrodes;

a compensation electrode disposed on the second touch control electrode and electrically connected to the second touch control electrode, wherein the compensation electrode is configured to compensate and expand the area of the second touch control electrode; and a touch control connection pad, wherein the touch control electrode array is electrically connected to the touch control connection pad through touch control signal lines;

wherein a compensation electrode line of the compensation electrode is electrically connected to a touch control electrode line of the second touch control electrode to form an electrical connection between the compensation electrode and the second touch control electrode; and an effective touch control area per unit area of the compensation electrode is larger than an effective touch control area per unit area of touch control electrodes in the touch control electrode array;

wherein the compensation electrode is electrically connected to the touch control electrode line of the second touch control electrode through a compensation electrode plate to form the electrical connection between the compensation electrode and the second touch control electrode.

9. The display device according to claim 8, wherein a line width of the compensation electrode line is greater than a line width of the touch control electrode line.

10. The display device according to claim 8, wherein the display panel comprises anon-bending area, a bending area, and a bonding area, the non-bending area is connected to the bonding area through the bending area, and the non-bending area comprises a display area and a non-display area located at a periphery of the display area;

wherein the touch control electrode array is arranged in the display area, and the compensation electrode disposed on the second touch control electrode at a corner of the touch control electrode array is located in the non-display area; and wherein the touch control connection pad is arranged in the bonding area, and a display connection pad is further arranged in the bonding area, and the display area is connected to the display connection pad through a display connection line.

11. The display device according to claim 8, wherein areas of some of the first touch control electrodes are the same, and are all S1, and a sum of the area of the second touch control electrode and an area of the compensation electrode is S2, wherein 0.75S1≤S2≤1.25S1.

12. The display device according to claim 8, wherein the first touch control electrodes and the second touch control electrode are arranged at equal intervals along a first direction and a second direction perpendicular to each other to form a matrix structure of the touch control electrode array;

the second touch control electrode is located at a corner area of the touch control electrode array;

a number of the second touch control electrode corresponds to a number of corners of the touch control electrode array, and the corners are in one-to-one correspondence with the second touch control electrode.

13. The display device according to claim 8, wherein the touch control electrode array corresponding to an under-screen camera is provided with the second touch control electrode that has the area smaller than each of the first touch control electrodes, and the compensation electrode is disposed on the second touch control electrode.

14. The display device according to claim 8, wherein a number of the touch control signal lines is the same as a number of touch control electrodes in the touch control electrode array, and the touch control signal lines are in one-to-one correspondence with the touch control electrodes; and wherein an end of each of the touch control signal lines is electrically connected to a corresponding one of the touch control electrodes, and another end of the touch control signal line is electrically connected to the touch control connection pad.

15. A display device, comprising: a display panel and a touch control panel, wherein the touch control panel comprises:

a touch control electrode array comprising a plurality of first touch control electrodes and at least one second touch control electrode, an area of the second touch control electrode is smaller than an area of each of the first touch control electrodes;

a compensation electrode disposed on the second touch control electrode and electrically connected to the second touch control electrode, wherein the compensation electrode is configured to compensate and expand the area of the second touch control electrode; and a touch control connection pad, wherein the touch control electrode array is electrically connected to the touch control connection pad through touch control signal lines;

wherein a compensation electrode line of the compensation electrode is electrically connected to a touch control electrode line of the second touch control electrode to form an electrical connection between the compensation electrode and the second touch control electrode; and an effective touch control area per unit area of the compensation electrode is larger than an effective touch control area per unit area of touch control electrodes in the touch control electrode array;

wherein a line width of the compensation electrode line gradually increases from an end close to the touch control electrode line to an end away from the touch control electrode line.

\* \* \* \* \*